(12) United States Patent
Amagai

(10) Patent No.: US 9,535,604 B2
(45) Date of Patent: Jan. 3, 2017

(54) DISPLAY DEVICE, METHOD FOR CONTROLLING DISPLAY, AND RECORDING MEDIUM

(71) Applicant: CASIO COMPUTER CO., LTD., Shibuya-ku, Tokyo (JP)

(72) Inventor: Hitoshi Amagai, Hino (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 12 days.

(21) Appl. No.: 14/486,043

(22) Filed: Sep. 15, 2014

(65) Prior Publication Data

US 2015/0084893 A1 Mar. 26, 2015

(30) Foreign Application Priority Data

Sep. 20, 2013 (JP) ................................. 2013-195902

(51) Int. Cl.
*G06F 3/0488* (2013.01)

(52) U.S. Cl.
CPC ....... *G06F 3/04886* (2013.01); *G06F 3/04883* (2013.01); *G06F 2203/04806* (2013.01)

(58) Field of Classification Search
CPC ..................................................... G06F 3/041
See application file for complete search history.

(56) References Cited

U.S. PATENT DOCUMENTS

| 2008/0046831 | A1* | 2/2008 | Imai | ...................... | G06F 15/025 715/765 |
| 2012/0327008 | A1* | 12/2012 | Kurita | ..................... | G06F 3/041 345/173 |

FOREIGN PATENT DOCUMENTS

JP 2013-061176 4/2013

* cited by examiner

*Primary Examiner* — Shaheda Abdin
(74) *Attorney, Agent, or Firm* — Amin, Turocy & Watson LLP

(57) ABSTRACT

According to the present invention, there is provided a display device including: an operation detecting unit configured to detect a touching operation conducted on a display screen; a determination unit configured to determine whether or not the touching operation detected by the operation detecting unit includes an operation involving movement of a touch position within a predetermined region of the display screen; a display unit configured to display an image on the display screen; and a control unit configured to control to enlarge or reduce the image size on the display screen around a position of image depending on at least one of a start position and an end position on the display screen of the touching operation in the case of the determination unit has determined that the touching operation includes the operation involving movement of the touch position within the predetermined region.

16 Claims, 5 Drawing Sheets

DISPLAY DEVICE, METHOD FOR CONTROLLING DISPLAY, AND RECORDING MEDIUM

CROSS-REFERENCE TO RELATED APPLICATION

The present application is based upon and claims the benefit of priority from the prior Japanese Patent Application No. 2013-195902, filed Sep. 20, 2013, the entire contents of which are incorporated herein by reference.

BACKGROUND OF THE INVENTION

1. Field of the Invention

The present invention relates to a display device that performs enlarged and reduced displays by a touching operation, a method for controlling a display, and a recording medium.

2. Description of the Related Art

In display devices such as smartphones, screen scrolling, character entry, etc. have been conducted by a touching operation on a screen. Further, a wrist-type display device has attracted much attention in recent years, which a user is wearing on an arm in order to use it. The wrist-type display device has been equipped with functions similar to those of smartphones. The wrist-type display device is described in Patent Literature 1 (Japanese Patent Application Laid-Open Publication No. 2013-061176).

The wrist-type information processing terminal, however, suffers from a restriction imposed on a touching operation since the display surface of the wrist-type information processing terminal is smaller than the display surfaces of other display devices including smartphones. In particular, users find it difficult to conduct operations that require them to use two fingers for zooming in or out on a display screen, while the operations can be usually conducted on smartphones as pinching-in and pinching-out, for example. The existing techniques are thus disadvantageous in that users have to find a difficulty in conducting, with one finger, a touching operation for zooming in and out intuitively and simply.

BRIEF SUMMARY OF THE INVENTION

The present invention has been made in view of the above situations and an object of the present invention is thus to enable us to intuitively and simply conduct, with one finger, a touching operation for enlarging or reducing an image size on a screen.

According to an embodiment of the present invention, there is provided a display device including: an operation detecting unit configured to detect a touching operation conducted on a display screen; a determination unit configured to determine whether or not the touching operation detected by the operation detecting unit includes an operation involving movement of a touch position within a predetermined region of the display screen; a display unit configured to display an image on the display screen; and a control unit configured to control to enlarge or reduce the image size on the display screen displayed by the display unit such that the image to be enlarge or reduce around a position of image depending on at least one of a start position and an end position on the display screen of the touching operation in the case of the determination unit has determined that the touching operation includes the operation involving movement of the touch position within the predetermined region.

Further, according to an embodiment of the present invention, there is provided a method for controlling the display of a display device, the method including the steps of: detecting a touching operation conducted on a display screen; determining whether or not the touching operation detected in the operation detecting step includes a predetermined operation involving movement of a touch position within a predetermined region of the display screen; and displaying an image on the display screen; and performing control to enlarge or reduce the image size on the display screen around a position of image depending on at least one of a start position and an end position on the display screen of the touching operation in the case of the determination step has determined that the touching operation includes the operation involving movement of the touch position within the predetermined region.

Furthermore, there is provided a nonvolatile recording medium that stores programs that a computer of a display device can read, in which the programs are for carrying out the functions of detecting a touching operation conducted on a display screen; determining whether or not the touching operation detected by the operation detecting function includes a predetermined operation involving movement of a touch position within a predetermined region of the display screen; and displaying an image on the display screen; and performing control to enlarge or reduce an image size on the display screen around a position of image depending on at least one of a start position and an end position on the display screen of the touching operation in the case of the determination function has determined that the touching operation includes the operation involving movement of the touch position within the predetermined region.

DETAILED DESCRIPTION OF THE INVENTION

Figure 1:
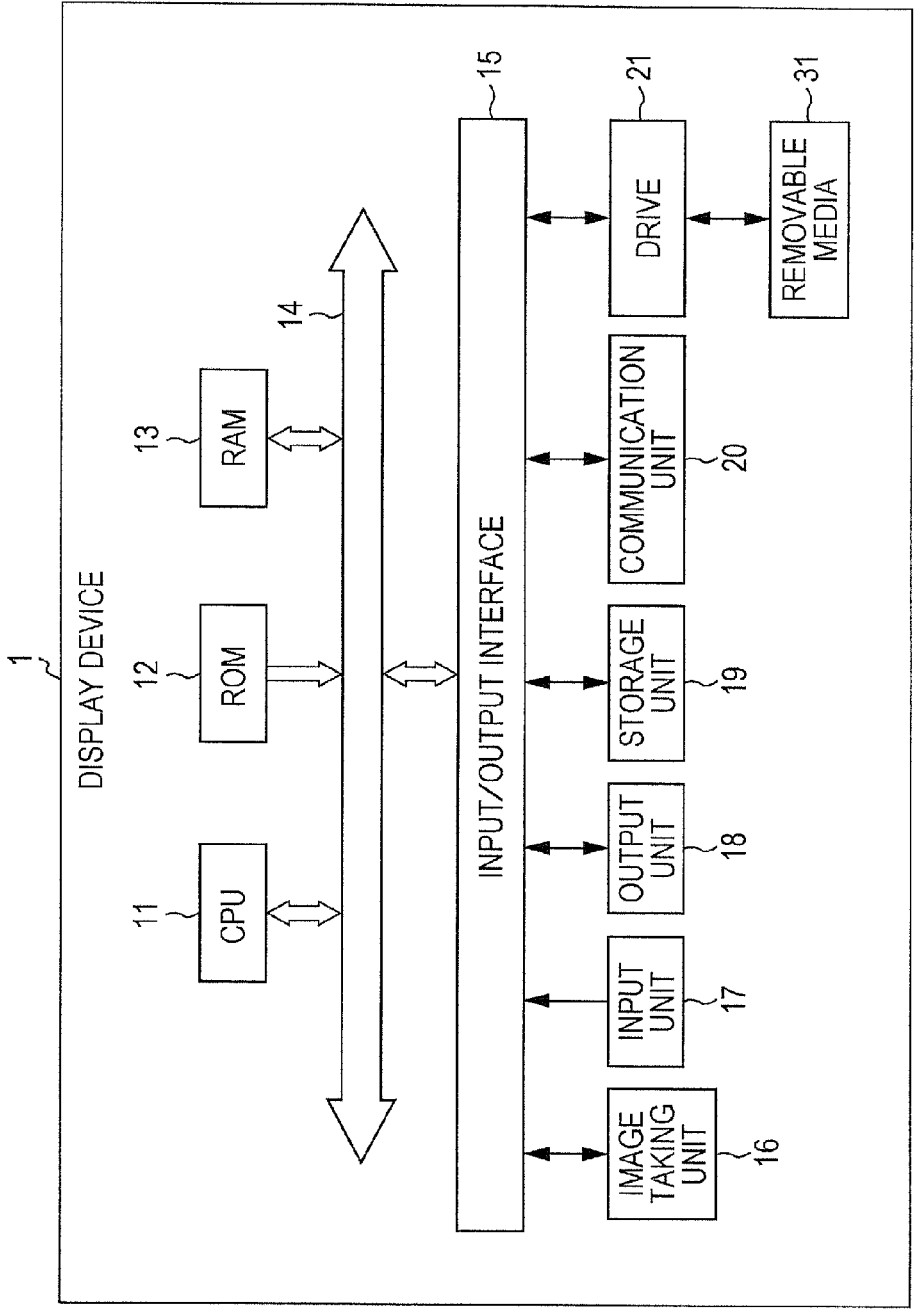
FIG. 1 is a block diagram illustrating a configuration of hardware of a display device according to an embodiment of the present invention.

An embodiment of the present invention will be hereinafter described with reference to the drawings.
[Configuration]
FIG. 1 is a block diagram illustrating a configuration of hardware of a display device 1 according to an embodiment of the present invention. The display device 1 is formed as a wrist-type terminal, for example.

The display device 1 includes a central processing unit (CPU) 11, a read only memory (ROM) 12, a random access memory (RAM) 13, a bus 14, an input/output interface 15, an image taking unit 16, an input unit 17, an output unit 18, a storage unit 19, a communication unit 20, and a drive 21.

The CPU 11 executes different types of processing in accordance with programs stored in the ROM 12 or programs loaded from the storage unit 19 into the RAM 13. For example, the CPU 11 executes touching operation control processing in accordance with a touching operation control processing program described later.

The RAM 13 adequately stores data, for example, that is necessary when the CPU 11 executes different types of processing.

The CPU 11, ROM 12, and RAM 13 are connected to one another via the bus 14. To the bus 14, the input/output interface 15 is connected. To the input/output interface 15, the image taking unit 16, the input unit 17, the output unit 18, the storage unit 19, the communication unit 20, and the drive 21 are connected.

The image taking unit 16 includes an optical lens unit and an image sensor not shown in the drawings.

The optical lens unit is formed of a condenser lens collecting lights for taking an image of an object, such as a focus lens or a zoom lens. A focus lens is a lens that forms an image of an object on a light receiving surface of the image sensor, and a zoom lens is a lens that freely changes a focus distance within a limited range. The optical lens unit is additionally provided as needed with a peripheral circuit that adjusts setting parameters including a focus point, exposure, and white balance.

The image sensor is formed of a photoelectric conversion element and an analog front end (AFE), for example. The photoelectric conversion element is, for example, a photoelectric conversion element of a complementary metal oxide semiconductor (CMOS) type. The photoelectric conversion element receives an image of an object emitted from the optical lens unit, and then photo-electrically converts (captures) the image and stores an image signal for a predetermined period of time. Further, the photoelectric conversion element sequentially supplies stored image signals to the AFE as analog signals.

The AFE executes different types of signal processing including analog/digital (A/D) conversion processing, on the analog image signals. Through the signal processing, digital signals are generated and are output as output signals of the image taking unit 16. The data indicated by the output signals of the image taking unit 16 will be hereinafter referred to as taken image data. The taken image data is adequately supplied to the CPU 11 and an image processing unit not shown in the drawings.

The input unit 17 is formed of different types of buttons, and inputs various types of information in accordance with instruction operations of a user. The output unit 18 is formed of a display or a speaker, for example, and outputs images or sounds. The embodiment employs a configuration in which a touch panel as the input unit 17 is placed over a display as the output unit 18, the configuration allowing the touching operation on the display screen. The storage unit 19 is formed of a dynamic random access memory (DRAM), for example, and stores data of images. The communication unit 20 controls communications with other devices (not shown in the drawings) via a network including the Internet.

The drive 21 is appropriately equipped with a removable media 31, which may be any one of a magnetic disk, an optical disk, a magneto-optical disk and a semiconductor memory, and so forth. The drive 21 reads a program from the removable media 31 and the program is installed into the storage unit 19 if necessary. The removable media 31 can store various data including the data of images stored in the storage unit 19 as the storage unit 19 can.

Figure 2:
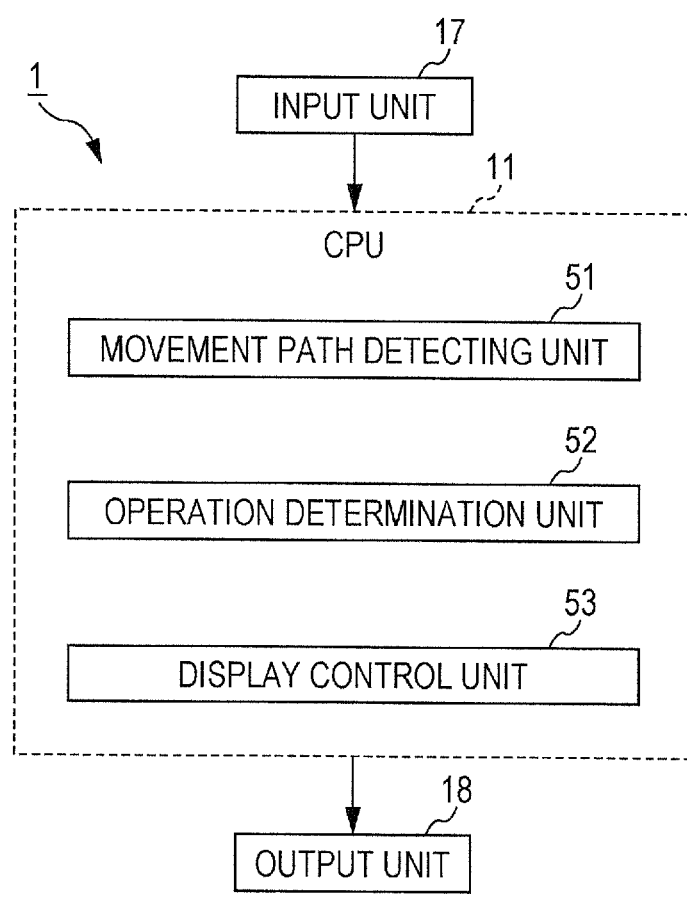
FIG. 2 is a functional block diagram illustrating a functional configuration for executing touching operation control processing of the functional configurations of the display device.

FIG. 2 is a functional block diagram illustrating a functional configuration for executing touching operation control processing of the functional configurations of the display device 1. The touching operation control processing means a series of processing from detecting movement of a touch position in a predetermined region of a display screen, such as the outer edges (the region extending from the outermost edges to the inner edges away from the outermost edges by a set number of pixels) and performing an enlarged display and a reduced display on the display screen based on the detection. The display device 1 in the embodiment not only controls a display in response to general touching operations including flick and tap but also performs an enlarged display and a reduced display on the display screen by the touching operation control processing. Further, the predetermined region of the display screen described above is not limited to the outer edges as long as enlarging or reducing an image size on the display screen is possible based on the detection of movement in the predetermined region of the display screen.

In order for the touching operation control processing to be executed, a movement path detecting unit 51, an operation determination unit 52, and a display control unit 53 function in the CPU 11 as shown in FIG. 2.

The movement path detecting unit 51 determines whether or not the touching operation has been performed. If having determined that the touching operation has been performed, the movement path detecting unit 51 detects a path which the touch position has followed from where the touching operation has been started (start position) to where the touching operation has been ended (end position). For example, the movement path detecting unit 51 sequentially detects addresses on the display screen of the region from where the touching operation has been started (start position) to where the touching operation has been ended (end position).

The operation determination unit 52 determines whether or not an action of moving in the outer edges of the display screen (hereinafter referred to as edge tracing operation) has been performed, based on the movement path taken in the touching operation detected by the movement path detecting unit 51. Further, if having determined that the edge tracing operation has been performed, the operation determination unit 52 detects the moving direction (from left to right or from top to bottom, for example) and the moving distance used in the edge tracing operation.

In the embodiment, the relation is previously set between the moving direction used in the edge tracing operation and zooming-out on the display screen and between the moving direction used in the edge tracing operation and zooming-in on the display screen. Specifically, in the regions of the outer edges of the display screen which extend along the right and left sides of the display screen, a top-to-bottom movement corresponds to zooming-out on the display screen and a bottom-to-top movement corresponds to zooming-in on the display screen. On the other hand, in the regions of the outer edges of the display screen which extend along the top and bottom sides of the display screen, a left-to-right movement corresponds to zooming-in on the display screen and a right-to-left movement corresponds to zooming-out on the display screen.

Further, in the embodiment, the moving distance used in the edge tracing operation is correlated in advance with the enlargement ratio or reduction ratio for the display screen. In other words, the enlargement ratio or the reduction ratio is set so that the longer the moving distance becomes, the larger the degree of zooming in or out becomes.

If the touching operation includes the edge tracing operation, the display control unit 53 enlarges or reduces an image size on the display screen depending on the moving direction and the moving distance for the edge tracing operation, around the start position or the end position for the touching operation. Further, if the direction is reversed in which the touch position is moved along a side of the display screen in the edge tracing operation, the display control unit 53 switches between an enlarged display and a reduced display on the display screen in accordance with the moving direction.

Figure 3A:
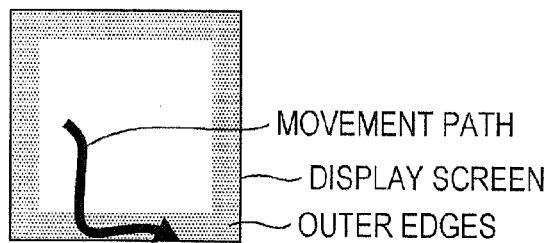
FIGS. 3A to 3D are schematic diagrams each illustrating a concept of an enlarged display or a reduced display on a display screen in response to an edge tracing operation.
Figure 3A:
Figure 3B:
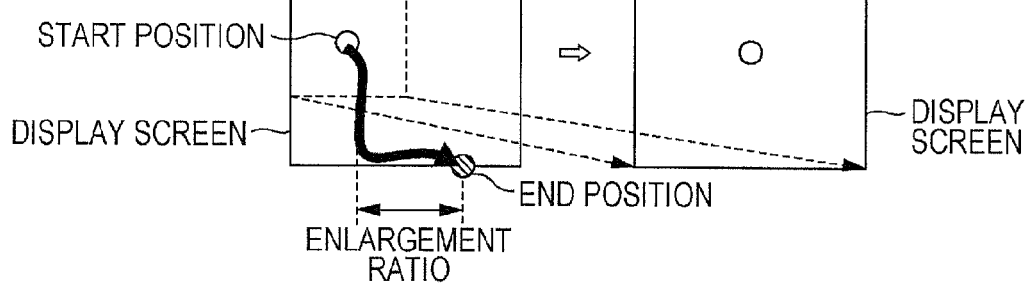

FIGS. 3A to 3D are schematic diagrams each illustrating a concept of an enlarged display or a reduced display of a display screen in response to an edge tracing operation. In FIG. 3A, the touch position is moved from the start position to a lower position on the display screen until it reaches the bottom side, and thereafter is moved in the right direction to the end position where the touching operation ends. In the example of FIG. 3A, since the touching operation includes an edge tracing operation that enlarges an image size, the display control unit 53 enlarges an image size on the display screen around the start position for the touching operation with an enlargement ratio appropriate for the moving distance for the edge tracing operation, as shown in FIG. 3B. In that case, since moving the touch position downward is the same as the usual dragging operation, the enlarged display around the start position is initiated by starting the edge tracing operation after the viewing area is scrolled down on the display screen to the bottom side of the display screen.

Figure 3C:
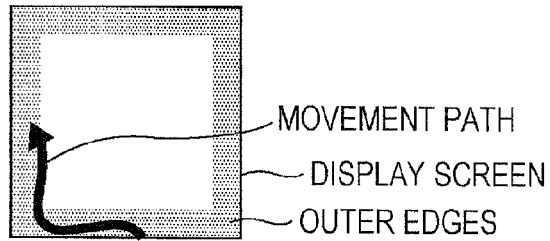
Figure 3D:
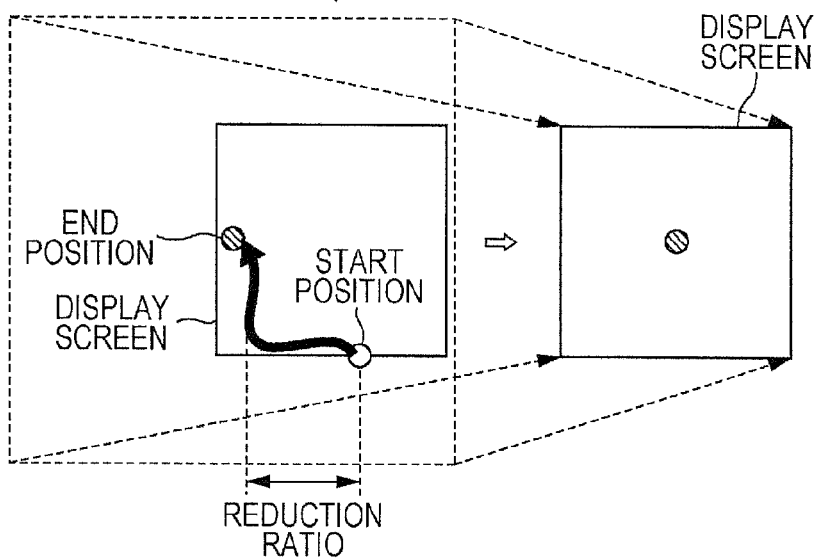

On the other hand, in FIG. 3C, the touch position is moved from the start position along the bottom side of the display screen to the left, and then is moved onto the display screen, and finally reaches the end position, where the touching operation ends. In that case, since the touching operation includes the edge tracing operation that reduces an image size, the display control unit 53 reduces an image size on the display screen around the end position for the touching operation with a reduction ratio appropriate for the moving distance for the edge tracing operation, as shown in FIG. 3D.

[Operations]

The operations will be described next.

Figure 4:
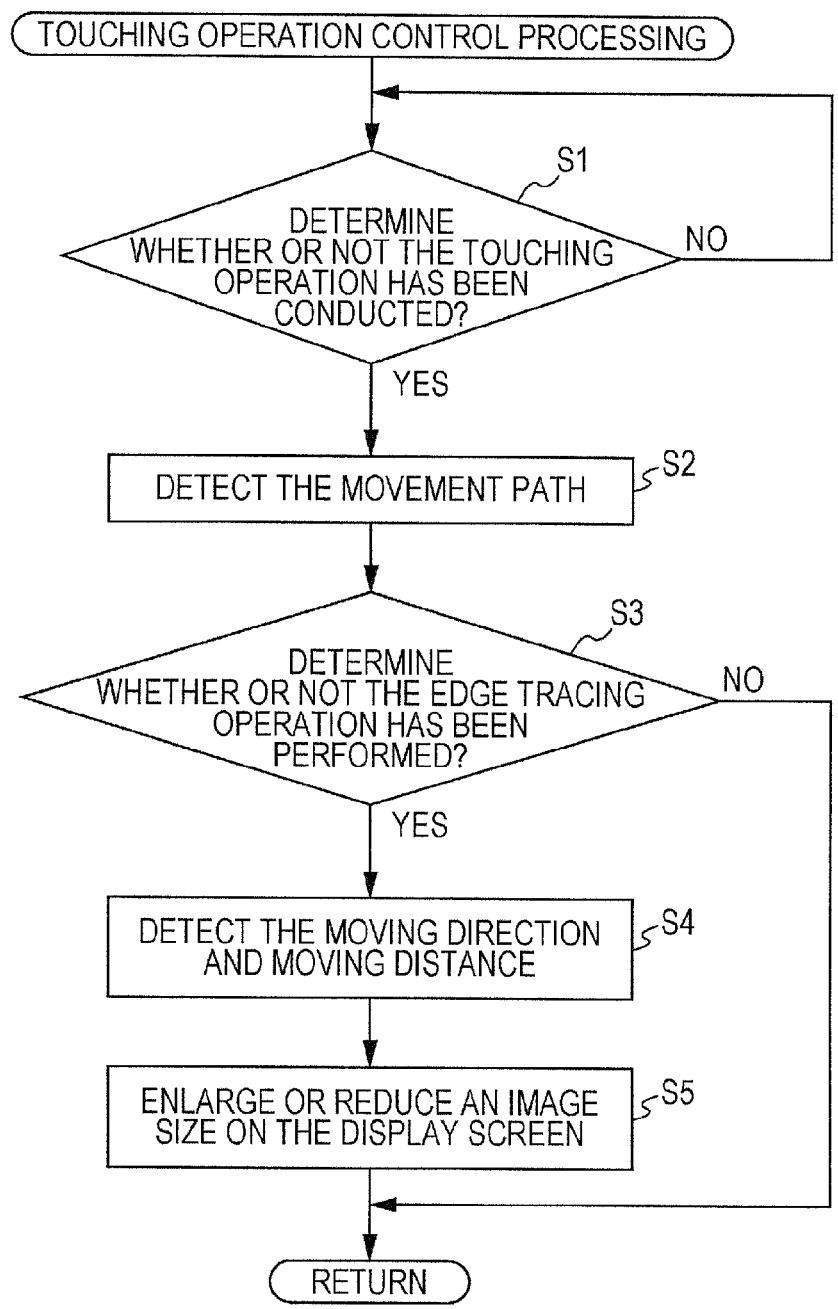
FIG. 4 is a flow chart for describing a flow of touching operation control processing executed by the display device in FIG. 1 having the functional configuration in FIG. 2.

FIG. 4 is a flow chart for describing a flow of touching operation control processing executed by the display device 1 in FIG. 1 having the functional configuration in FIG. 2. The touching operation control processing is started when the display device 1 is turned on, and is repeatedly performed until the display device 1 is turned off.

In Step S1, when the touching operation control processing is started, the movement path detecting unit 51 determines whether or not the touching operation has been performed on the display screen. If the touching operation has been performed on the display screen, Step S1 makes a judgment of YES and the procedure moves on to Step S2. On the other hand, if the touching operation has not been performed on the display screen, Step S1 makes a judgment of NO and the processing in Step S1 is repeated.

In Step S2, the movement path detecting unit 51 detects a path which the touch position has followed from where the touching operation has been started (start position) to where the touching operation has been ended (end position). In Step S3, the operation determination unit 52 determines whether or not the edge tracing operation has been performed on the movement path for the touching operation detected by the movement path detecting unit 51. If the edge tracing operation has been performed, Step S3 makes a judgment of NO and the touching operation control processing is repeated. On the other hand, if the edge tracing operation has not been performed, Step S3 makes a judgment of YES and the procedure moves on to Step S4.

In Step S4, the operation determination unit 52 detects a moving direction and a moving distance for the edge tracing operation. In Step S5, the display control unit 53 enlarges or reduces an image size on the display screen depending on the moving direction and the moving distance for the edge tracing operation, around the start position or the end position for the touching operation. Specifically, the display control unit 53 enlarges an image size on the display screen around the start position when the edge tracing operation as shown in FIG. 3A is performed, and reduces an image size on the display screen around the end position when the edge tracing operation as shown in FIG. 3C is performed. After Step S5, the touching operation control processing is repeated.

The display device 1 thus formed includes the movement path detecting unit 51, the operation determination unit 52, and the display control unit 53.

The movement path detecting unit 51 detects the touching operation conducted on the display screen. The operation determination unit 52 determines whether or not the touching operation detected by the movement path detecting unit 51 includes the edge tracing operation involving movement in the outer edges of the display screen. The display control unit 53 performs control so as to enlarge or reduce an image size on the display screen depending on the direction and the distance with respect to the movement in the outer edges if the operation determination unit 52 has determined that the touching operation includes the edge tracing operation. In this way, performing the edge tracing operation involving movement in the outer edges of the display screen in the process of conducting the touching operation on the display screen makes is possible to enlarge or reduce an image size on the display screen of the display device 1 in the direction corresponding to each movement. Further, the enlargement or reduction of an image size on the display screen is performed with an enlargement ratio or a reduction ratio appropriate for the distance for the edge tracing operation. It thus becomes possible for us to conduct, with one finger, a touching operation for zooming in and out intuitively and simply.

Furthermore, the display control unit 53 enlarges or reduces an image size on the display screen, around at least one of the start position and the end position on the display screen for the touching operation. This enables users to intuitively and simply specify the center of a region to be zoomed in or out on the display screen.

If the direction is reversed in a process of the edge tracing operation where the touching position is moved in the outer edges of the display screen, the display control unit 53 performs control for switching between an enlarged display and a reduced display on the display screen in response to the direction of the movement. This makes users to be able to check the display screen by flexibly switching between an enlarged display and a reduced display on the display screen in the edge tracing operation, whereby the convenience can be further increased of performing the touching operation for zooming in and out on the display screen.

Application Example 1

Figure 5A:
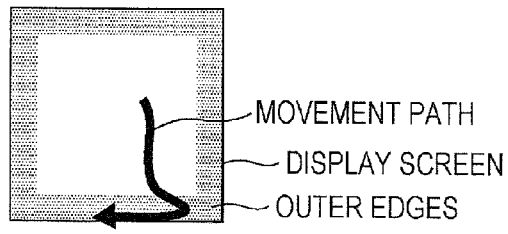
FIGS. 5A to 5D are schematic diagrams each illustrating a concept of a reduced display on a display screen in response to an edge tracing operation.

In the embodiment, when an image size on the display screen is to be reduced by the edge tracing operation, the reduced display may be performed around either the end position or the start position for the touching operation as shown in FIG. 3C. FIGS. 5A to 5D are schematic diagrams each illustrating a concept of a reduced display on the display screen in response to the edge tracing operation. In FIG. 5A, the touch position is moved from the start position to a lower position on the display screen until it reaches the bottom side, and then is slightly moved in the right direction. Thereafter, the touch position is significantly moved in the reversed direction, which is the left direction, to the end position, where the touching operation ends.

Figure 5B:
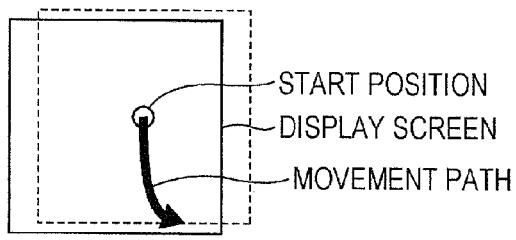
Figure 5C:
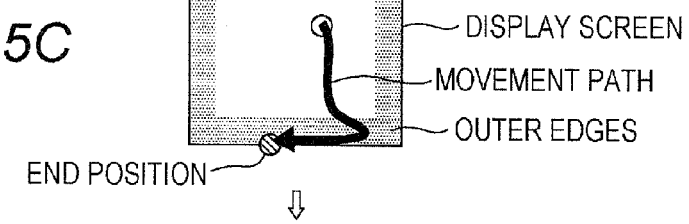
Figure 5D:
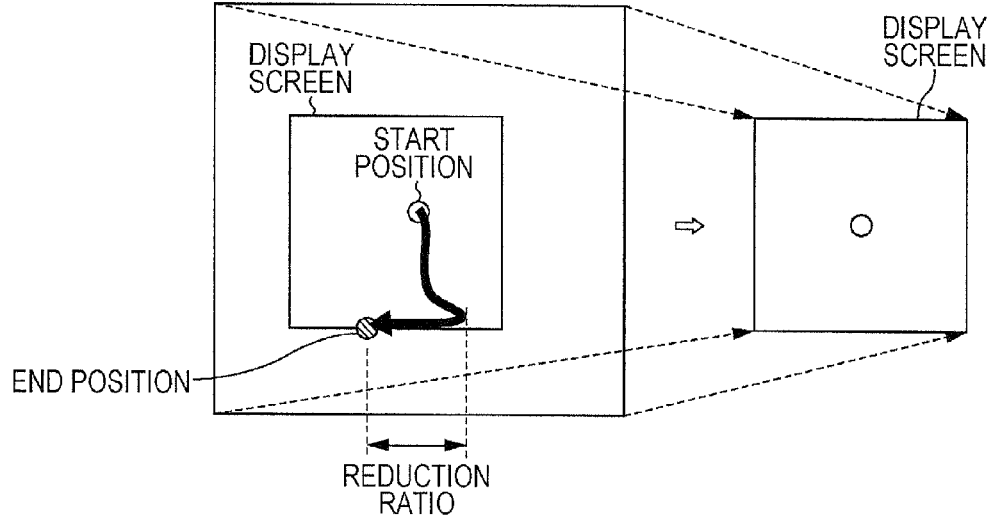

In that case, since moving the touch position downward is the same as the usual dragging operation, the viewing area is scrolled down on the display screen, as shown in FIG. 5B. If the touch position reaches the bottom side of the display screen and then is moved to the right along the side, an enlarged display around the start position is initiated. Alternatively, the touch position may be moved to the left immediately after it reaches the bottom side, instead of being moved to the right. Further, if the direction of moving the touch position is reversed, that is, if the contacting position is moved to the left along the side as shown in FIG. 5C, a reduced display around the start position is initiated. In this way, a reduced display around the start position for the touching operation is performed as shown in FIG. 5D.

The above operational manners can achieve not only the enlarged display shown in FIGS. 3A and 3B but also the reduced display on the display screen around the start position for the touching operation. Hence, an enlarged display and a reduced display can be performed in the unified operational manners.

In addition to using the same operational manner for a reduced display and for the enlarged display shown in FIGS. 3A and 3B, the end position for the touching operation may be used as the center of a region to be zoomed in on the display screen, as in the case of the reduced display shown in FIGS. 3C and 3D.

In such an enlarged display, the touch position is moved from the start position along the bottom side of the display screen to the right and then is moved onto the display screen, and finally reaches the end position, where the touching operation ends. Since the touching operation includes the edge tracing operation that enlarges an image size, the display control unit 53 enlarges an image size on the display screen around the end position for the touching operation with an enlargement ratio appropriate for the moving distance for the edge tracing operation.

The above operational manners can achieve as well not only the reduced display shown in FIGS. 3C and 3D but also the enlarged display on the display screen around the end position for the touching operation. Hence, an enlarged display and a reduced display can be performed in the unified operational manners.

It is to be noted the present invention is not limited to the above embodiment and includes variations and modifications that occur within the range in which the objects of the present invention can be accomplished.

While the embodiment has been described as an example in which in the regions of the outer edges of the display screen which extend along the right and left sides of the display screen, a top-to-bottom movement corresponds to zooming-out on the display screen and a bottom-to-top movement corresponds to zooming-in on the display screen, the present invention is not limited to that example. In other words, the present invention may be configured so that in the regions of the outer edges of the display screen which extend along the right and left sides of the display screen, a bottom-to-top movement corresponds to zooming-out on the display screen and a top-to-bottom movement corresponds to zooming-in on the display screen. Likewise, while the embodiment has been described as an example in which the regions of the outer edges of the display screen which extend along the top and bottom sides of the display screen, a left-to-right movement corresponds to zooming-in on the display screen and a right-to-left movement corresponds to zooming-out on the display screen, the present invention is not limited to that example. In other words, the present invention may be configured so that in the regions of the outer edges of the display screen which extend along the top and bottom sides of the display screen, a right-to-left movement corresponds to zooming-in on the display screen and a left-to-right movement corresponds to zooming-out on the display screen. Moreover, in the outer edges of the display screen, the relation can be reversed between the direction of movement along the left and right sides and the enlargement/reduction of an image size, or between the direction of movement along the top and bottom sides and the enlargement/reduction of an image size. For example, moving the touch position in the outer edges of the display screen in a counterclockwise direction corresponds to zooming-in on the display screen and moving the touch position in a clockwise direction corresponds to zooming-out on the display screen.

Further, while a wrist-type terminal is used in the embodiment as the display device 1 according to the present invention, it is not the only example of the display device 1. For example, the present invention is applicable to notebook-sized personal computers, tablet terminals, printers, television receivers, video cameras, mobile navigation devices, mobile phones, smartphones, portable game machines, and so forth.

The series of processing described above can be executed by either hardware or software. In other words, the functional configuration in FIG. 2 is only exemplary. It is sufficient if the display device 1 is equipped with functions that can practically execute the series of processing and any other functional block than that in FIG. 2 may be used for realizing the functions. Further, a single function block may be formed of hardware only, software only, or a combination of hardware and software.

If the series of processing is to be executed by software, the programs of the software are installed from a network or a recording medium into a computer, for example. The computer may be a computer build in dedicated hardware, or be a computer such as a general personal computer that is capable of executing different functions with different programs installed therein.

The recording medium having the programs includes not only the removable media 31 in FIG. 1 distributed separately from the device body to a user for providing the user with programs but also a recording medium built in the device body in advance and provided to the user. The examples of the removable media 31 include a magnetic disk (floppy disk, for example), an optical disk, and a magneto-optical disk. The examples of the optical disk include a compact disk-read only memory (CD-ROM), a digital versatile disk (DVD), and a Blu-ray Disc (registered trademark). The magneto-optical disk is an MD (Mini-Disk), for example. Further, the recording medium built in the device body in advance and provided to the user is the ROM 12 in FIG. 1 storing programs or hardware contained in the storage unit 19 in FIG. 1, for example.

In the specification, the steps of describing the programs stored in the recording medium include not only processing performed in accordance with the order of the steps but also processing performed in parallel with one another or individually performed.

While several embodiments of the present invention have been described, the embodiments are only exemplary and do not limit the technical range of the present invention. It should be understood that the present invention may be implemented in other different embodiments and various kinds of alterations including omissions and replacements may occur as long as they are within the gist of the present invention. The embodiments and modified examples are within the scope and gist of the invention described in the specification, etc., and within the scope of the invention described in the appended claims or the equivalents thereof.

What is claimed is:

1. A display device comprising:
   an operation detecting unit configured to detect a touching operation conducted on a display screen;
   a determination unit configured to determine whether or not the touching operation detected by the operation detecting unit includes an operation involving movement of a touch position within a predetermined region of the display screen, the predetermined region having a height and a width;
   a display unit configured to display an image on the display screen; and
   a control unit configured to control to enlarge or reduce the image size on the display screen displayed by the display unit such that the image is enlarged or reduced in the case of the determination unit has determined that the touching operation includes the operation involving movement of the touch position within the predetermined region.

2. The display device according to claim 1, wherein the control unit is configured to enlarge or reduce the image size on the display screen along a direction in which the touch position is moved.

3. The display device according to claim 1, wherein the control unit is configured to perform control for switching between an enlarged display and a reduced display on the display screen in response to reversal of movement direction of the touch position if the determination unit has determined that the direction of moving the touch position has been reversed in a process where it is moved within the predetermined region on the display screen.

4. The display device according to claim 1, wherein the control unit controls an enlargement ratio or a reduction ratio used for enlarging or reducing an image size on the display screen depending on a distance for which the touch position has been moved within the predetermined region, if the determination unit has determined that the touching operation includes an operation involving movement of the touch position within the predetermined region of the display screen.

5. The display device according to claim 1, wherein the touching operation is a single touching operation.

6. The display device according to claim 1, wherein the predetermined region is outer edges of the display screen.

7. A display device comprising:
   an operation detecting unit configured to detect a touching operation conducted on a display screen;
   a determination unit configured to determine whether or not the touching operation detected by the operation detecting unit includes an operation involving movement of a touch position within a predetermined region of the display screen, the predetermined region extending along at least one side of the display screen;
   a display unit configured to display an image on the display screen; and
   a control unit configured to control to enlarge or reduce the image size on the display screen displayed by the display unit such that the image is enlarged or reduced in the case of the determination unit has determined that the touching operation includes the operation involving movement of the touch position within the predetermined region.

8. The display device according to claim 7, wherein the control unit is configured to enlarge or reduce the image size on the display screen along a direction in which the touch position is moved.

9. The display device according to claim 7, wherein the control unit is configured to perform control for switching between an enlarged display and a reduced display on the display screen in response to reversal of movement direction of the touch position if the determination unit has determined that the direction of moving the touch position has been reversed in a process where it is moved within the predetermined region on the display screen.

10. The display device according to claim 7, wherein the control unit controls enlargement ratio or a reduction ratio used for enlarging or reducing an image size on the display screen depending on a distance for which the touch position has been moved within the predetermined region, if the determination unit has determined that the touching operation includes an operation involving movement of the touch position within the predetermined region of the display screen.

11. The display device according to claim 7, wherein the touching operation is a single touching operation.

12. The display device according to claim 7, wherein the predetermined region comprises outer edges of the display screen.

13. A method, comprising:
    detecting, by system comprising a processor, a touching operation conducted on a display screen;
    determining, by the system, whether or not the touching operation includes an operation involving movement of a touch position within a predetermined region of the display screen, the predetermined region having a height and a width;
    displaying, by the system, an image on the display screen; and
    controlling, by the system, to enlarge or reduce the image size on the display screen such that the image is enlarged or reduced in the case of determining that the touching operation includes the operation involving movement of the touch position within the predetermined region.

14. A method, comprising:
    detecting, by a system comprising a processor, a touching operation conducted on a display screen;
    determining, by the system, whether or not the touching operation includes an operation involving movement of a touch position within a predetermined region of the display screen, the predetermined region extending along at least one side of the display screen;
    displaying, by the system, an image on the display screen; and
    controlling, by the system, to enlarge or reduce the image size on the display screen such that the image is enlarged or reduced in the case of determining that the touching operation includes the operation involving movement of the touch position within the predetermined region.

15. A non-transitory recording medium that stores programs that a computer of a display device can read, wherein the programs are for carrying out the functions of:
- detecting, a touching operation conducted on a display screen;
- determining whether or not the touching operation includes an operation involving movement of a touch position within a predetermined region of the display screen, the predetermined region having a height and a width;
- displaying an image on the display screen; and
- controlling to enlarge or reduce the image size on the display screen such that the image is enlarged or reduced in the case of determining that the touching operation includes the operation involving movement of the touch position within the predetermined region.

16. A non-transitory recording medium that stores programs that a computer of a display device can read, wherein the programs are for carrying out the functions of:
- detecting a touching operation conducted on a display screen;
- determining whether or not the touching operation includes an operation involving movement of a touch position within a predetermined region of the display screen, the predetermined region extending along at least one side of the display screen;
- displaying an image on the display screen; and
- controlling to enlarge or reduce the image size on the display screen such that the image is enlarged or reduced in the case of determining that the touching operation includes the operation involving movement of the touch position within the predetermined region.

\* \* \* \* \*